Sept. 22, 1953  W. N. ASHCRAFT  2,653,050
REARVIEW WINDOW PROTECTOR
Filed Aug. 25, 1950

William N. Ashcraft
INVENTOR.

BY *Clarence A. O'Brien*
*and Harvey B. Jacobson*
Attorneys

Patented Sept. 22, 1953

2,653,050

UNITED STATES PATENT OFFICE 2,653,050

REARVIEW WINDOW PROTECTOR

William N. Ashcraft, Ardmore, Okla.

Application August 25, 1950, Serial No. 181,441

1 Claim. (Cl. 296—95)

This invention relates to improvements in attachments for vehicles.

It is the primary object of the present invention to provide an improved visor or protector for a window of a vehicle, particularly the rear view window thereof, which visor is provided with improved means for attaching the visor to various standard components of the vehicle, for example the gutters, the body immediately above the trunk opening.

Ancillary objects and features of importance will become apparent in following the description of the illustrated forms of the invention.

Figure 1:
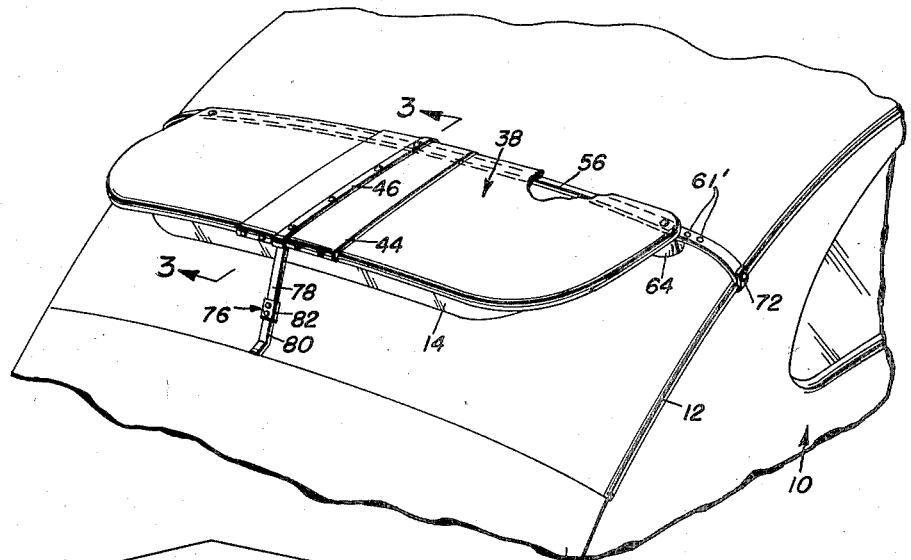
Figure 1 is a fragmentary rear perspective view of a vehicle showing a preferred form of the invention.

In carrying out this invention there is illustrated by way of environment a typical vehicle 10 having conventional gutters, one of which is indicated at 12, a conventional window 14 and a trunk lid 16.

The visor generally indicated at 38 consists of a panel which in this instance is made of two side panel sections 40 and 42, respectively. The sections 40 and 42 are held together by a means specifically provided for this purpose. Said means consists of an inverted channel 44 forming a central panel section with a trim strip 46 secured thereto by means of the metal screws 48. Rivets may be employed in lieu of the metal screws if found desirable.

The channel 44 has two sets 50 and 52, respectively, of metal screws passed through openings as at 47 in the legs thereof forming upper and lower edge flanges 43, 45 and also through openings, as at 51, 53 in the downturned upper and lower edge flanges 54 and 55, respectively, of the sections 40 and 42. By this construction the sections may be extended with respect to each other or retracted with respect to each other so as to cause the panel to be extensible to accommodate various standard makes of vehicles which have large or small windows 14.

Figure 2:
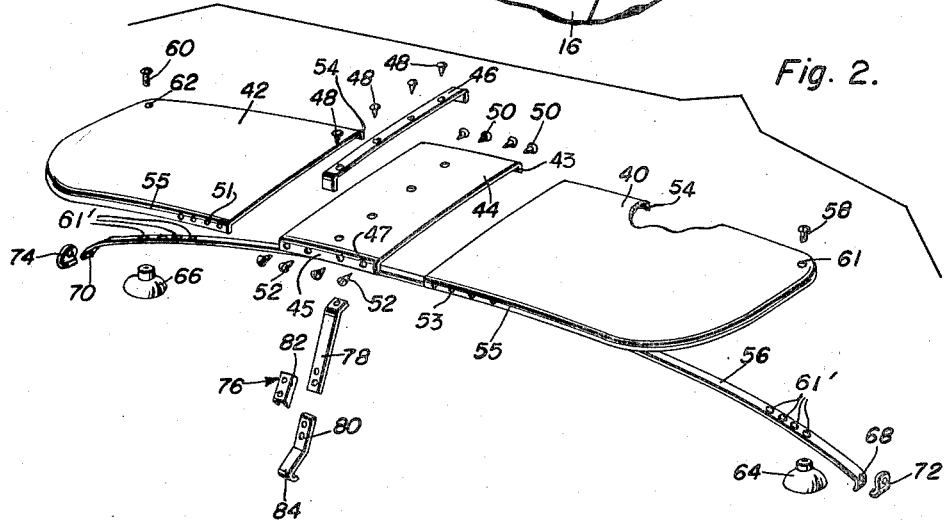
Figure 2 is an exploded perspective view of the visor partly broken away and shown in section.
Figure 3:
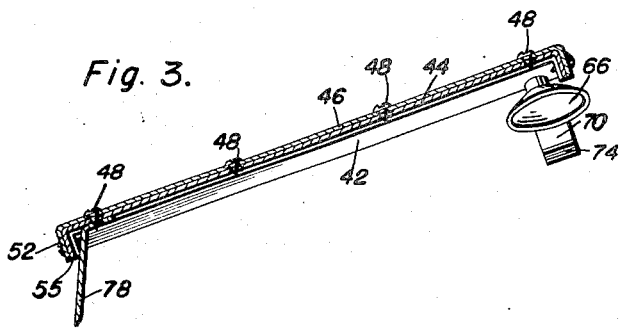
Figure 3 is a transverse sectional view taken substantially on the line 3—3 of Figure 1 and in the direction of the arrows.

A strip 56 is secured to the undersurface of the panel below the upper edge thereof by means of the screws 58 and 60 which pass through openings 61 and 62 in the upper corners of the panel. These screws also pass through selective openings 61' in the strip 56 and terminate in engagement with the suction cups 64 and 66 to thereby hold them in place. Means for attaching this form of the visor to the vehicle are provided near the upper corners of the panel in addition to the suction cups 64 and 66. Reference to Figures 2 and 3 shows that the ends of the strip 56 are turned downwardly as at 68 and 70 so that the hooks 72 and 74, respectively, may be attached thereto, as by screws. The hooks are so shaped and of such size as to be capable of clamping upon the outer surface of the gutters 12, while the ends of the strip 56 serve as abutments to engage the upper edge of the gutter 12.

To further hold the visor 38 in place on the vehicle a support 76 is attached by means of one of the screws 48 to the channel 44 and extends downwardly. The support 76 consists of a strap 78 which is connected to another strap 80 by means of a coupling 82, the straps 78 and 80 being provided with a number of apertures while the coupling 82 is also provided with a number of apertures. Standard screws are passed through sets of said apertures to hold the support 76 assembled in the necessary length to accommodate the visor and hold it in a selected position.

The lower end of the strap 80 is provided with a hook 84 to engage and straddle the lower edge of the roof panel of the vehicle, in the space provided for the trunk lid 16.

Having described the invention, what is claimed as new is:

A visor for use over the rear view window of an automobile body having top edge gutters, said visor comprising a pair of side panel sections having inner ends confronting and depending upper and lower edge flanges having apertures therein, means connecting said side sections together for endwise adjustment to extend and contract said visor endwise comprising a central panel section overlying said confronting ends of said side sections and having depending upper and lower flanges overlying the first named flanges and provided with apertures therein, fasteners selectively insertable through said apertures to secure said sections together in different adjusted positions of said side sections, and means for securing the visor to said body comprising a fastening strip extending longitudinally under said sections at the upper edges thereof and fixed to said side sections, said strip terminating in hooks engaged with said gutters, and a support for said central section depending from the lower edge thereof and engaged with said top.

WILLIAM N. ASHCRAFT.

References Cited in the file of this patent

UNITED STATES PATENTS

| Number | Name | Date |
|---|---|---|
| 2,109,571 | Le Boeuf | Mar. 1, 1938 |
| 2,334,856 | Atkinson | Nov. 23, 1943 |
| 2,389,002 | Schatzman et al. | Nov. 13, 1945 |
| 2,475,901 | Kipp | July 12, 1949 |
| 2,497,050 | Thibault | Feb. 7, 1950 |
| 2,502,838 | Garceau | Apr. 4, 1950 |